United States Patent [19]

Takenaka

[11] Patent Number: 4,771,343
[45] Date of Patent: Sep. 13, 1988

[54] DEVICE FOR PRINTING AND FOR RECORDING ELECTRICAL IMAGE SIGNALS OF PHOTOGRAPHIC PICTURES

[75] Inventor: Yuji Takenaka, Ashigarakami, Japan

[73] Assignee: Fuji Photo Film Co., Ltd., Kanagawa, Japan

[21] Appl. No.: 823,353

[22] Filed: Jan. 28, 1986

[30] Foreign Application Priority Data

Feb. 1, 1985 [JP] Japan .................................. 60-16664

[51] Int. Cl.[4] .......................... H04N 5/76; H04N 3/36; H04N 5/253
[52] U.S. Cl. ..................................... 358/335; 358/244; 358/54; 358/214; 358/102; 360/3; 360/35.1
[58] Field of Search ............... 358/335, 342, 345, 244, 358/909, 214, 54, 102; 360/1–3, 35.1, 55, 137

[56] References Cited

U.S. PATENT DOCUMENTS 4,442,453 4/1984 Verdier ........................... 358/102 X
4,641,198 2/1987 Ohta ................................ 358/214 X

*Primary Examiner*—Robert L. Richardson
*Attorney, Agent, or Firm*—Parkhurst & Oliff

[57] ABSTRACT

A device for recording image signals of photographic pictures, wherein the photographic pictures on a negative film are converted to electrical image signals by a video camera and recorded in a recording medium such as a magnetic disc. This device for recording image signals also produces a print on a print paper from the negative film. Light transmitted through the negative film is split into two images including an image falling on an image sensing surface of a video camera and another image for exposing a print paper.

7 Claims, 4 Drawing Sheets

DEVICE FOR PRINTING AND FOR RECORDING ELECTRICAL IMAGE SIGNALS OF PHOTOGRAPHIC PICTURES

BACKGROUND OF THE INVENTION

1. Field of the Invention

This invention relates to a device for recording image signals of photographic pictures, and more particularly to a device for recording image signals of photographic pictures, wherein the photographic pictures are formed on a negative film, and wherein the image signals are produced by a video camera and are recorded on a recording medium such as a magnetic disc.

2. Description of the Prior Art

Along with the spread of the video camera in recent years, there has been utilized a so-called video television album, wherein photographed subjects such as photographic negative films, prints and the like are recorded in a magnetic disc, video tape and the like for storage, and are reproduced with images being projected on a screen of a television for entertainment. Along with this, such a service will shortly become available that, similar to the photographic print service, photographic pictures formed on negative film or the like are image-sensed in a photographic processing laboratory (hereinafter referred to as a "labo"), recorded in a magnetic disc or the like, and the magnetic disc thus recorded is delivered to customers.

Now, in the above-described video television album, it is necessary to provide a device for recording image signals of photographic pictures in the magnetic disc from the negative film. It would be highly convenient if the above-described device for recording image signals is a device which is also useable as a printer for printing from the negative film onto a print paper.

SUMMARY OF THE INVENTION

The present invention has as its object the provision of a device for recording image signals of photographic pictures, wherein image signals of photographic pictures can be recorded in a magnetic disc from a negative film and exposure can be made from the negative film to a print paper.

To this end, the present invention includes a first optical system for irradiating alight emitted from light source onto a negative film, photographic pictures recorded on the negative film being made to focus on an image sensing surface of an image signal producing device. The image signals of the photographic pictures output from the image signal producing device are then recorded. The invention also includes a light splitter provided in a light path between the negative film and the image sensing surface of the image signal producing device, for splitting the light transmitted through the negative film into two including light falling onto the image sensing surface of the image signal producing device, and light for exposing a print paper through a second optical system.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

A detailed description will hereunder be given of the preferred embodiments of a device for recording image signals of photographic pictures according to the present invention with reference to the accompanying drawings.

Figure 1:
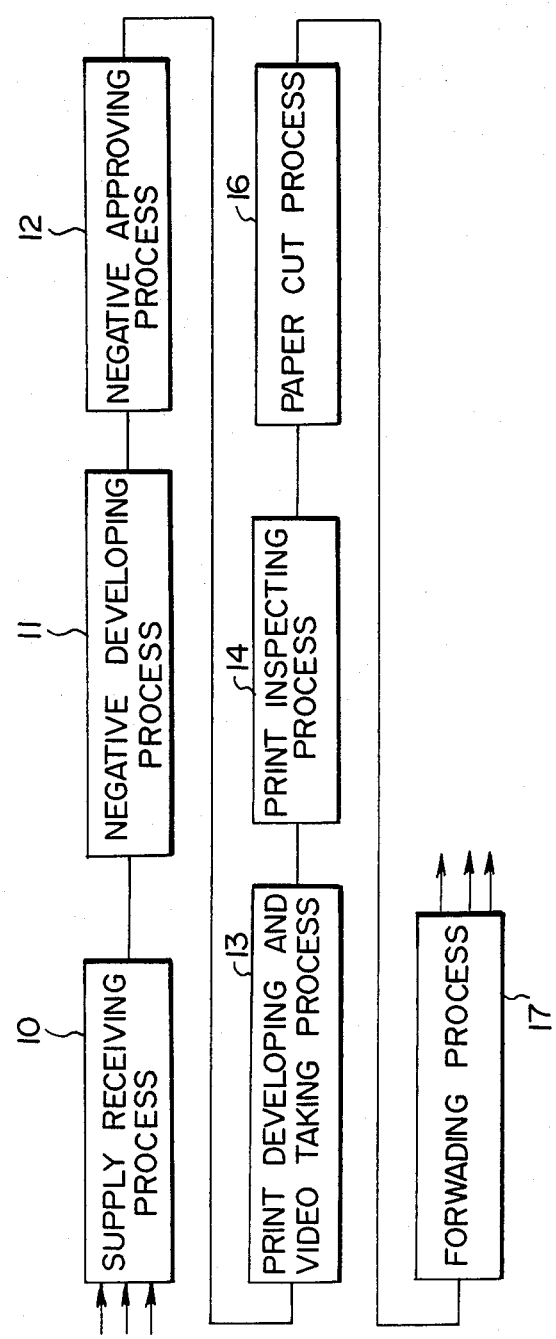
FIG. 1 is a flow sheet showing the method of recording image signals of photographic pictures of the present invention.

FIG. 1 shows the flow sheet showing the method of recording image signals of photographic pictures. First, during a supply receiving process 10, film magazines containing exposed film are collected from respective Development and Print shops. During this supply receiving process 10, the magazines are sorted in accordance with the orders from customers (simultaneous printing, development of only the negatives, use of silk grains, use of luster, and the like), film manufactures and the like. After the magazines are sorted during the supply receiving process 10, check labels (Identity (ID) Nos.) for later confirmation are attached to an order bag and the forward end of the exposed films, which are delivered to a succeeding negative developing process 11. During negative developing process 11, scores of unit films taken out of the film magazines are spliced to one another, to provide a long film. The long film thus spliced is developed by a negative processor. The long negative film thus developed in the negative developing process 11 is negative-approved in the succeeding negative approving process 12. During the negative approving process 12, the long negative is judged by a negative approving device as to whether the negative is printable or not, and thereafter, the respective frames are subjected to appropriate density compensation, color compensation and the like. More specifically, if the negative is printable, then in the negative approving device, notches are formed on the side edges of each of the frames on long negative and data of the density compensation, color compensation and the like are recorded on a paper tape separately thereof as will be described hereunder.

Figure 2:
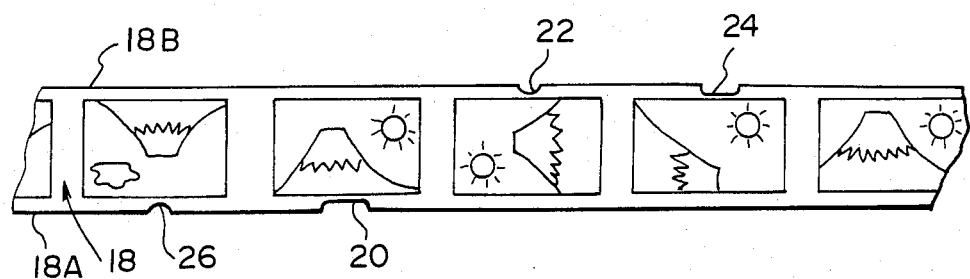
FIG. 2 is an explanatory view showing the negative film used in the device for recording image signals of photographic pictures according to the present invention.

Referring to FIG. 2, notches 20 and 26 are formed on either one of edge portions 18A and 18B of a film 18 used in this embodiment so as to indicate in what direction each of the photographic pictures is taken. In this embodiment, four directions of the photographic pictures are indicated, including a lateral position (normal position) indicated by a notch 20, a left longitudinal position by a notch 22, a right longitudinal position by a notch 24 and an inverted position by a notch 26. Here, marks indicating the normal position, the positions turned to the sides and the inverted position need not necessarily be limited to those in this embodiment in position and shape, and may be attached to any position as long as the above-described directions can be discriminated.

During the print developing and video taking process, the long negative is exposed to a roll-shaped print paper by a printer on the basis of the data inputted to the paper tape during the negative approving process 12. More specifically, in the printer, judgment is made as to whether the long negative is printable or not from the presence of the notches directly formed on the negative, and further, each of the frames of the photographic pictures is printed on the roll-shaped paper, while being corrected on the basis of the data recorded on the paper tape concerning the density compensation, color compensation and the like. At the same time, the photographic pictures of the negative film are magnetically recorded in a magnetic disc for an electronic camera and an ID No. associated with the negative film is added to the magnetic disc during the video recording. In this case, recording based on the data checked during the aforesaid negative approving process 12 is made into the magnetic disc.

Figure 3:
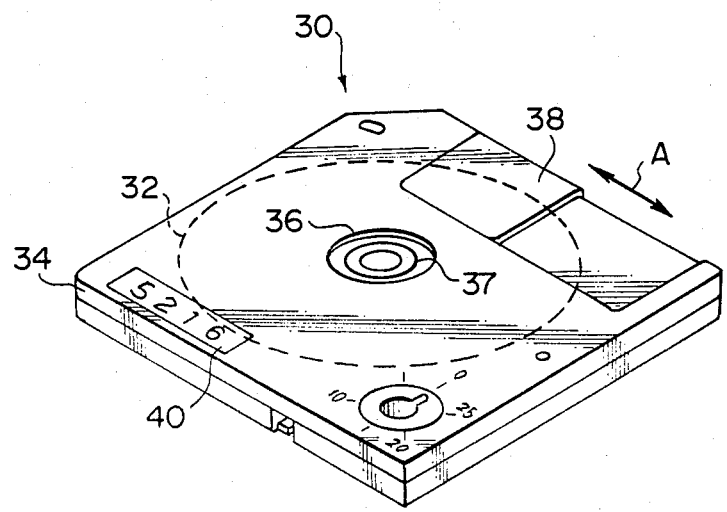
FIG. 3 is a perspective view of the magnetic disc pack used in the present invention.

FIG. 3 shows a magnetic disc pack 30 used in this embodiment. This disc pack 30 comprises a thin and small-sized magnetic disc 32 for recording image signals and a casing 34 for rotatably receiving therein magnetic disc 32. Provided substantially at the center of the casing 34 is a circular opening 36, through which is exposed a core 37 formed at the center of the magnetic disc pack 30. The disc pack 30 is provided with a shutter 38 movable in directions parallel to one side of the disc pack 30 as indicated by a double-headed arrow A. When this shutter 38 is moved to a position opposite to the position as shown, an opening of the casing 38 disposed thereunder is exposed, so that a magnetic head of a recorder-reproducer, not shown, can be brought near to or abutted against disc 32 to record or reproduce the image signals of the photographic pictures.

Figure 4:
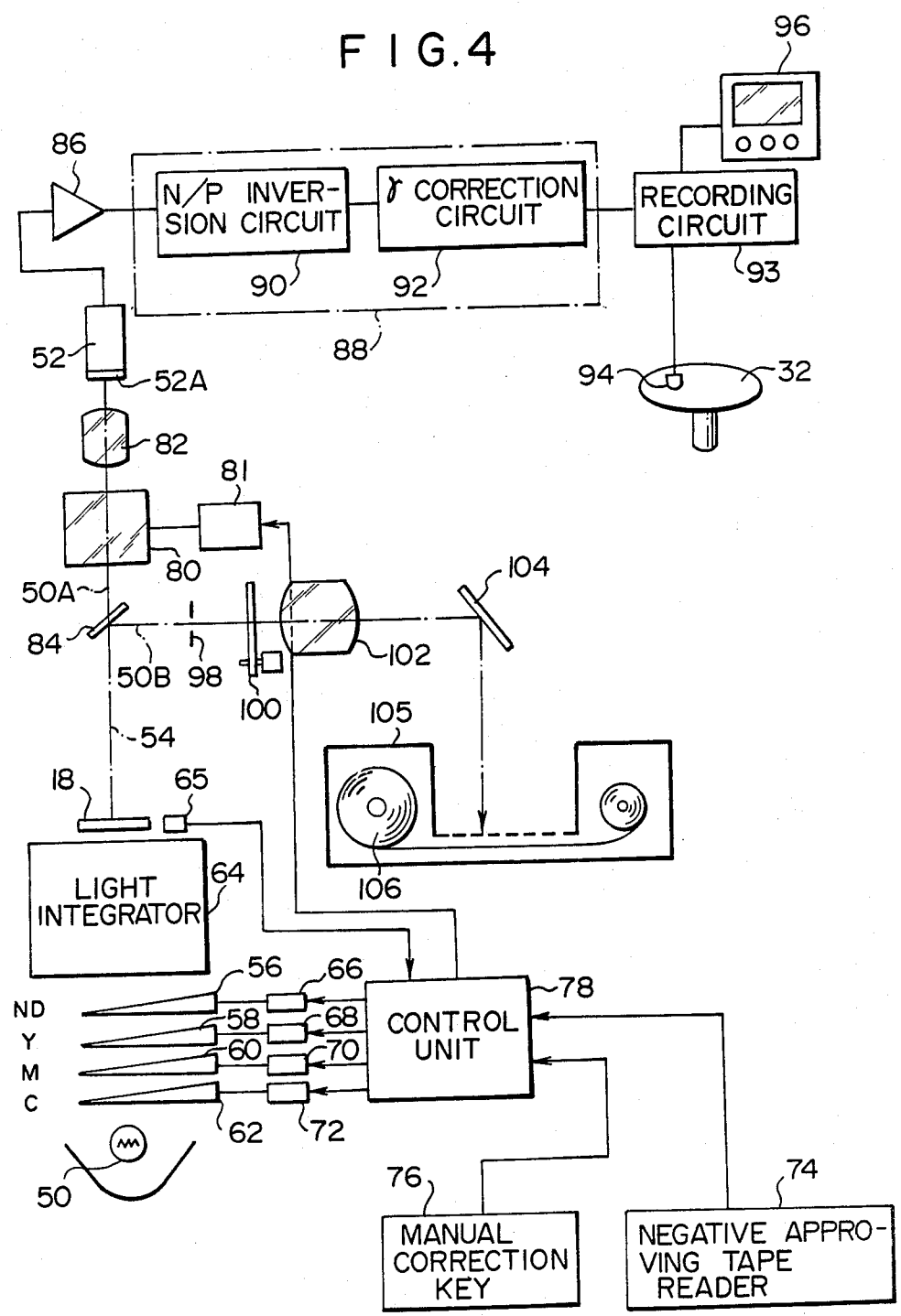
FIG. 4 is a block diagram of a first embodiment of the present invention.

Upon completion of recording of the image signals of the photographic pictures in the disc pack 30, and ID No.40 identical with that of the order bag and the negative film is attached onto the casing 34 by a check label, printing or the like. Next, FIG. 4 shows the arrangement of one embodiment of the device for recording image signals of photographic pictures, used in the print developing and video process 13.

The device for recording image signals of photographic pictures according to the present invention has a first optical system beginning with a light source 50 including a lamp electric source and ending at a video camera head 52, and further including, as shown, an ND filter 56, a Y filter 58, an M filter 60, a C filter 62 provided on an optical axis 54 of the first optical system. The ND filter 56 is a wedge filter capable of continuously varying the optical density, which is inserted into or removed from the optical axis 54 by a filter motor 66 in a plane perpendicular to the optical axis 54, to thereby vary the intensity of light transmitted therethrough. Furthermore, the filters 58, 60 and 62 are color correction filters, which are inserted by filter motors 68, 70 and 72 into the optical axis 54 in a plane perpendicular to the optical axis 54 when necessary.

The motors 66 to 72 for driving the filters 56 to 62 are controlled in the following manner. The tape recorded with the negative approving data obtained during the negative approving process 12 is read by a tape reader 74 or the negative approving data are input to a control unit 78 by the operation of a manual correction key 76, and, in order to perform a predetermined color correction on the basis of these data, control signals are delivered from the control unit 78 to the filter motors 66 to 72.

A negative film 18 is disposed upwardly of a light integrator 64, a half mirror 84 is provided upwardly of the negative film 18, and a lengthwise-crosswise variable prism 80 is disposed upwardly of the half mirror 84. The lengthwise-crosswise variable prism 80 is driven by a prism motor 81 operable in response to a control signal output from the control unit 78 on the basis of detected notches 20 to 26 (FIG. 2) formed on either one of the edge portions 18A and 18B of the negative film 18, so that imaging in the longitudinal direction or in the lateral direction can be performed. Additionally, the notches 20 to 26 formed on the negative film can be detected by a film detecting element 65, and a signal thus detected is applied to the control unit 78. A first lens 82 is disposed upwardly of the lengthwise-crosswise variable prism 80. Light 50A transmitted through the half mirror 84 passes through the lengthwise-crosswise variable prism 80 and the first lens 82, and made to focus on an image sensing surface of the video camera head 52. An image signal output from the video camera head 52 is amplified by a pre-amplifier 86, and therafter, input to a process circuit 88. In an N/P inversion circuit 90 in the process circuit 88, a luminance level of an image signal is inverted and the image signal is converted into a positive image. Further, images in frames of the film 18 photographed under various conditions departing from standard exposure conditions and lighting, are corrected to those having a desirable color tone in an $\gamma$ correction circuit, so that the image signals reproduce the images with natural colors as close as possible to the colors intended by the photograph. The image signals output from the $\gamma$ correction circuit 92 are modulated by a predetermined recording method such as FM modulation in a recording circuit 93, recorded into the magnetic disc 32 through a magnetic head 94, and, at the same time, the photographic pictures of the image signals can be observed on a monitor television 96.

At the same time, light 50B reflected by the half mirror 84 passes through an aperture 98, a shutter 100 and a second lens 102, is inverted by a mirror 104, and exposes a roll-shaped print paper 106 contained in a cassette 105. As described above in this recording device, there is provided a second optical system beginning with the half mirror 84 and ending at a printing surface of the print paper 106. Additionally, the roll-shaped long negative film, which has completed printing during the print developing and video taking process 13 (FIG. 1), is cut by a negative cutter into units of six frames for example, and inserted into a bag (negative sheath) containing a portion of one negative film.

The print developing and video taking process 13 is followed by a print inspecting process 14, where the roll-shaped print is unwound, whereby inspection of reprinted frames, is carried out.

Thereafter, during a paper cut process 16, the roll-shaped print is cut and separated one frame from another by a paper cutter.

The negative films and the prints, which have been cut as described above, and, the magnetic discs recorded with the photographic pictures are subjected to collation with the associated order bags with reference to the ID Nos., and thereafter, shipped to the respective Development and Print shops during forwarding process 17.

In the above arrangement, input to the control unit 78 are negative approving data obtained during the negative approving process 12 by the tape reader 74, negative measuring data by the operation of the manual correction key 76, and data concerning the shapes and positions of the notches formed on the edge portions 18A and 18B of the negative film 18 by the film detecting element 65.

The control unit 78 outputs control signals to the filter motors 66 to 72 for causing the filters 56 to 62 to be inserted into or removed from the optical axis 54 in a plane perpendicular to the optical axis 54 to make color correction on the basis of these inputted data control unit 78 also outputs control signals to the prism motor 18 for rotating the lengthwise-crosswise variable prism 80 through predetermined angles, so that the photographic pictures in the right or left longitudinal position, or the inverted position can be recorded in the normal position in the magnetic disc 32 or the print paper 106.

As the result, the light emitted from the light source 50 passes through the filters 56 to 62, through the light integrator, and is transmitted through the negative film 18. The half mirror 84 splits the light transmitted through the negative film 18 into two including light 50A falling into the image sensing surface 50A of the video camera head 52, and reflected light 50B for exposing the print paper 106. The incident light 50A transmitted through the half mirror 84 is image-rotated through a predetermined angle by the lengthwise-crosswise variable prism 80. The image-rotated light allows the photographic picture recorded on the negative film to focus at the image sensing surface 52A of the video camera head 52 by use of the first lens 82. The video camera head 52 senses this image, whereby color-separated image signals are output to the process circuit 88 through the pre-amplifier 86. In the process circuit 88, the luminance level of the inputted signals are inverted by the N/P inversion circuit 90, to thereby obtain positive image signals showing a positive image. the positive image is then corrected by the γ correction circuit to the conditions close to the color tone obtained when photographing under standard conditions. The image signals output from the γ correction circuit 92 are modulated by recording circuit 93, recorded in the magnetic disc 32 through the magnetic head 94, and output to the monitor television 96, whereby the photographic picture produced by the image signals is displayed on the screen of the monitor television 96.

At the same time, the reflected light split by the half mirror 84 passes through the aperture 98, the shutter 100 and the second lens 102, all of which constitute the second optical system, and is reflected by the mirror 104, and irradiated onto the print paper 106 contained in the cassette 105, whereby the print paper 106 is exposed, so that the photographic pictures recorded on the negative film 18 can be printed.

As has been described hereinabove, in this embodiment, there are provided two functions including a function of recording the image signals indicating the photographic pictures on the negative film into the recording medium and another function of exposing the photographic pictures from the negative film onto the print paper and printing the same. thus Furthermore, the printing operation can be performed while the monitor television 96 is observed, whereby the printing can be performed with the conditions of the negative film being known, so that the quality of print can be estimated.

Figure 5:
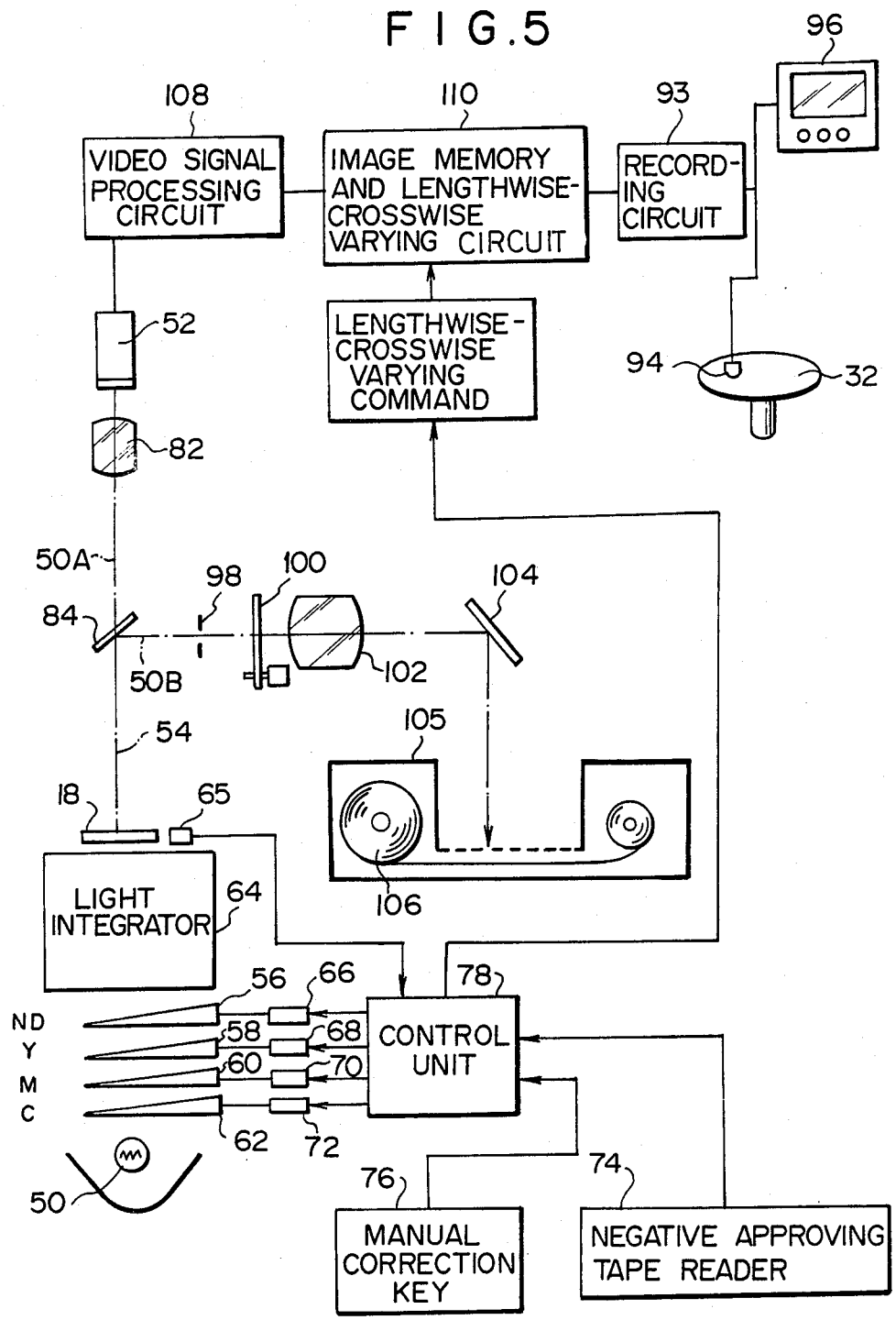
FIG. 5 is a block diagram of a second embodiment according to the present invention.

FIG. 5 shows another embodiment of the present invention. In the embodiment shown in FIG. 5, reference numerals in the embodiment shown in FIG. 4 are used to designate the same or similar parts, so that the detailed description need not be repeated. In this embodiment, in place of the process circuit 88 shown in the embodiment of FIG. 4, there are provided a video signal processing circuit 108, an image memory and a lengthwise-crosswise varying circuit 110, with the lengthwise-crosswise prism 80 being omitted. In the above embodiment, the image signals (color separated signals) obtained from the video camera head 52 are composed by the video signal processing circuit, and are, output as digital signals indicating image data per unit picture element.

The image memory and the lengthwise-crosswise varying circuit 110 accept the digital signals indicating picture element data, the picture element data being stored in predetermined addresses of the image memory, and the lengthwise-crosswise varying being performed in response to a lengthwise-crosswise varying command output from the control unit to change the arrangement of the picture element data in the image memory. Necessary processing such as density correction and color correction are then performed, and the data are output to the recording circuit 93. The other operations are similar to those in the embodiment shown in FIG. 4.

In this embodiment, a description has been given of processing for mass production in the photographic processing laboratory (labo), however, this embodiment is applicable to processing for producing in small quantities in processing operations in the Development and Print shops (minilabo). In the minilabo, the operations are carried out such that the films can be processed one after another without splicing scores of films to one another, and manual operations by operators are partly utilized. The manual operations by the operators of this type are input from a keyboard such as the correction key 76.

As described above, the device for recording image signals of photographic pictures according to the present invention can be used as recorder for recording the image signals of photographic pictures into a magnetic disc and additionally used as a printer for exposing the photographic pictures onto print paper, thus proving highly convenient.

Since the device for recording the photographic pictures according to the present invention is of a double function type as described above, the device is suitable for disc recording and print processing in Development and Print shops, where production in small quantities is normally performed (minilabo).

It should be understood, however, that there is no intention to limit the invention to the specific forms disclosed, but on the contrary, the invention is to cover all modifications, alternate constructions and equivalents falling within the spirit and scope of the invention as expressed in the appended claim.

What is claimed is:

1. A device for recording images of photographic pictures, comprising:
    a first optical system including:
        light source means for emitting light and for transmitting said light through a negative film embodying photographic pictures;

means for producing electrical image signals including an image sensing surface;

means for focusing said light transmitted through said negative film onto said image sensing surface;

means for recording said electrical image signals output from said means for producing;

light splitting means located between said negative film and said image sensing surface in a path of said light transmitted through said negative film, for splitting said light transmitted through said negative film into first and second images, said first image being focussed on said image sensing surface; and a second optical system including means for focussing said second image produced by said beam splitting means onto a print paper to expose said print paper.

2. A device for recording image signals of photographic pictures as recited in claim 1, wherein said first optical system further includes variable prism means, located between said negative film and said image sensing surface and being rotatable through predetermined angles, for changing an orientation of said light transmitted through said negative film whereby said light has a single orientation when focussed on said image sensing surface.

3. A device for recording image signals of photographic pictures as recited in claim 2, wherein said means for producing electrical image signals is a video camera.

4. A device for recording image signals of photographic pictures as recited in claim 3, wherein said recording means includes:

inversion circuit means for inverting a luminescence level of said electrical image signals produced by said means for producing, to provide inverted electrical image signals; and correction circuit means for correcting a color tone of said inverted electrical image signals.

5. A device for recording image signals of photographic pictures as recited in claim 1 further comprising:

video signal processing circuit means for converting said electrical image signals produced by said means for producing into a digital image signal including a plurality of unit picture elements;

an image memory for storing said plurality of unit picture elements in predetermined addresses; and varying circuit means for changing an orientation of an image represented by said plurality of unit picture elements responsive to a varying command.

6. A device for recording image signals of photographic pictures as set forth in claim 1, wherein said recording medium is a magnetic disc.

7. A device for recording image signals of photographic pictures as set forth in claim 1, wherein said print paper is a roll-shaped print paper.

* * * * *